(12) United States Patent
Ugolin (10) Patent No.: US 9,738,834 B2
(45) Date of Patent: Aug. 22, 2017

(54) GTL PROCESS AND REACTOR EMPLOYING A MOBILE PHASE AND PLASMA

(71) Applicant: Nicolas Gilbert Ugolin, Paris (FR)

(72) Inventor: Nicolas Gilbert Ugolin, Paris (FR)

(73) Assignee: Nicolas Gilbert Ugolin, Paris (FR)

( * ) Notice: Subject to any disclaimer, the term of this patent is extended or adjusted under 35 U.S.C. 154(b) by 72 days.

(21) Appl. No.: 14/396,653

(22) PCT Filed: Apr. 26, 2013

(86) PCT No.: PCT/EP2013/058799
§ 371 (c)(1),
(2) Date: Oct. 23, 2014

(87) PCT Pub. No.: WO2013/160467
PCT Pub. Date: Oct. 31, 2013

(65) Prior Publication Data
US 2015/0322349 A1    Nov. 12, 2015

(30) Foreign Application Priority Data

Apr. 27, 2012 (FR) ..................... 12 01232

(51) Int. Cl.
*B01J 19/12* (2006.01)
*B01J 8/08* (2006.01)
*C10G 2/00* (2006.01)
*B01J 19/08* (2006.01)
*B01J 8/00* (2006.01)

(52) U.S. Cl.
CPC ............. *C10G 2/32* (2013.01); *B01J 8/0045* (2013.01); *B01J 8/0055* (2013.01); *B01J 8/08* (2013.01); *B01J 19/088* (2013.01); *B01J 19/126* (2013.01); *B01J 19/127* (2013.01); *C10G 2/332* (2013.01); *C10G 2/334* (2013.01); *C10G 2/342* (2013.01); *C10G 2/35* (2013.01); *B01J 2208/0053* (2013.01); *B01J 2208/00743* (2013.01); *B01J 2219/0807* (2013.01); *B01J 2219/0811* (2013.01); *B01J 2219/0818* (2013.01); *B01J 2219/0869* (2013.01); *B01J 2219/0871* (2013.01); *B01J 2219/0883* (2013.01);
(Continued)

(58) Field of Classification Search
None
See application file for complete search history.

(56) References Cited

U.S. PATENT DOCUMENTS 5,993,761 A    11/1999  Czernichowski et al.
2010/0258429 A1  10/2010  Ugolin

FOREIGN PATENT DOCUMENTS

FR    2945033    11/2010

*Primary Examiner* — Kishor Mayekar
(74) *Attorney, Agent, or Firm* — Duane Morris LLP; J. Rodman Steele, Jr.; Gregory M. Lefkowitz (57) ABSTRACT

An alternative process and device for carrying out Fischer Tropsch (FT) syntheses is proposed, allowing the reactant entities that take part in the FT reaction to be activated and their contributions, whether by quantity or by proportion, to be adjusted. The process consists in making a particulate phase, optionally consisting of catalytic particles, flow through a reactor. While flowing through the reactor, the particulate phase is subjected at regular intervals to the action of a plasma obtained from a gas, such as hydrogen, thus enabling hydrogen activation for hydrogenation of carbon monoxide, or carbon monoxide activation in order to lengthen the carbon chains.

11 Claims, 8 Drawing Sheets

(52) U.S. Cl.
CPC *B01J 2219/0892* (2013.01); *B01J 2219/0898* (2013.01)

GTL PROCESS AND REACTOR EMPLOYING A MOBILE PHASE AND PLASMA

CROSS-REFERENCE TO RELATED APPLICATIONS

This application is a §371 national stage entry of International Application No. PCT/EP2013/058799, filed Apr. 26, 2013, which claims priority to French Patent Application No. 1201232, filed Apr. 27, 2012, the entire contents of which are incorporated herein by reference.

INTRODUCTION

The exhaustion of petroleum resources and the carbon dioxide ($CO_2$) pollution brought about by the combustion of petroleum fossil fuels (one of the main causes of global warming) are leading to the development of methods for producing more environmentally friendly non-fossil petroleum, known as second-generation biofuel.

Specifically, the energy requirements of transport, whereby it is necessary for the vehicle itself to store and transport the energy, and the alternatives proposed in view of these problems remain unsatisfactory, especially for air transport, leading to the development of non-polluting fuels. Specifically, this type of fuel is one of the most suitable and best understood solutions.

Fischer-Tropsch "FT" synthesis makes it possible to produce various paraffins and olefins (in addition to water and alcohol), which can be used directly in existing combustion vehicles, from $CO/H_2$ synthesis gas. These products are environmentally friendly, as long as the synthesis gas can be produced from household waste or biomass using renewable energy. Specifically, if it can be produced from recyclable carbon, the product of FT, which does not contain aromatic compounds or sulphur, has a very low carbon footprint in use.

Unfortunately the FT reaction, which is among the gas-to-liquid "GTL" technologies, is complex, and a proportion of 20 to 50% of the carbon from the carbon monoxide is lost as $CO_2$ or methane in the catalytic reactions developed at present. Even if this carbon is not of fossil origin, it reduces the ecological performances of the fuels produced, as well as reducing the economic yield. Moreover, supplying a mixture of $CO/H_2$ synthetic gas of constant proportions, as is done in the current processes, leads to losses of yield with regard to the lengthening of the carbon chains, as a result of the differences in CO and $H_2$ distribution at the catalytic sites and of the change in these distributions as the reaction advances. A process and a device are proposed which make it possible to activate the reaction participants and to change the supplies both in terms of amount and in terms of the proportions of the various elements participating in the FT reaction. Moreover, the novel geometry of the device makes it easier to load the catalysts into and unload them from the reactor and to separate the products and the catalysts than with the structures generally used for FT reactors.

Operating Principle

The process consists in activating the synthesis gases, such as dihydrogen, carbon monoxide and/or a mixture thereof, to form a plasma, and subsequently exposing a particle phase, optionally catalytic, to the activated gases in succession at regular intervals. Each optionally activated synthesis gas, for example carbon monoxide, dihydrogen etc., is applied in turn to the particle phase. In some variants, the mixture of synthesis gases, such as carbon monoxide and dihydrogen, with variable proportions of each gas, optionally supplemented with one or more additive plasmagenic gases such as argon, helium, nitrogen, $CO_2$, is applied in turn to the particle phase.

Figure 1:
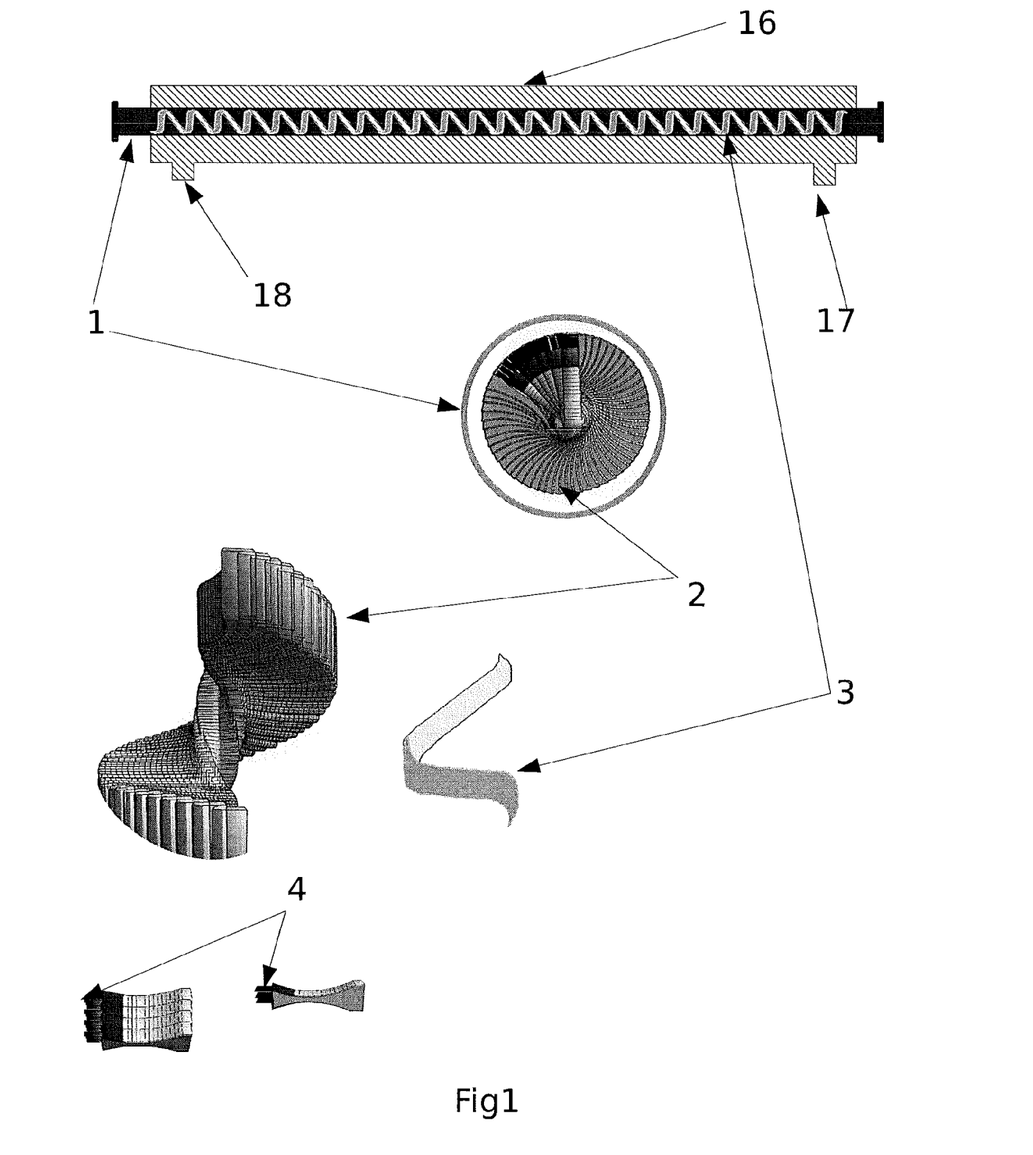
FIG. 1 is a diagram showing a FT reactor.
Figure 2:
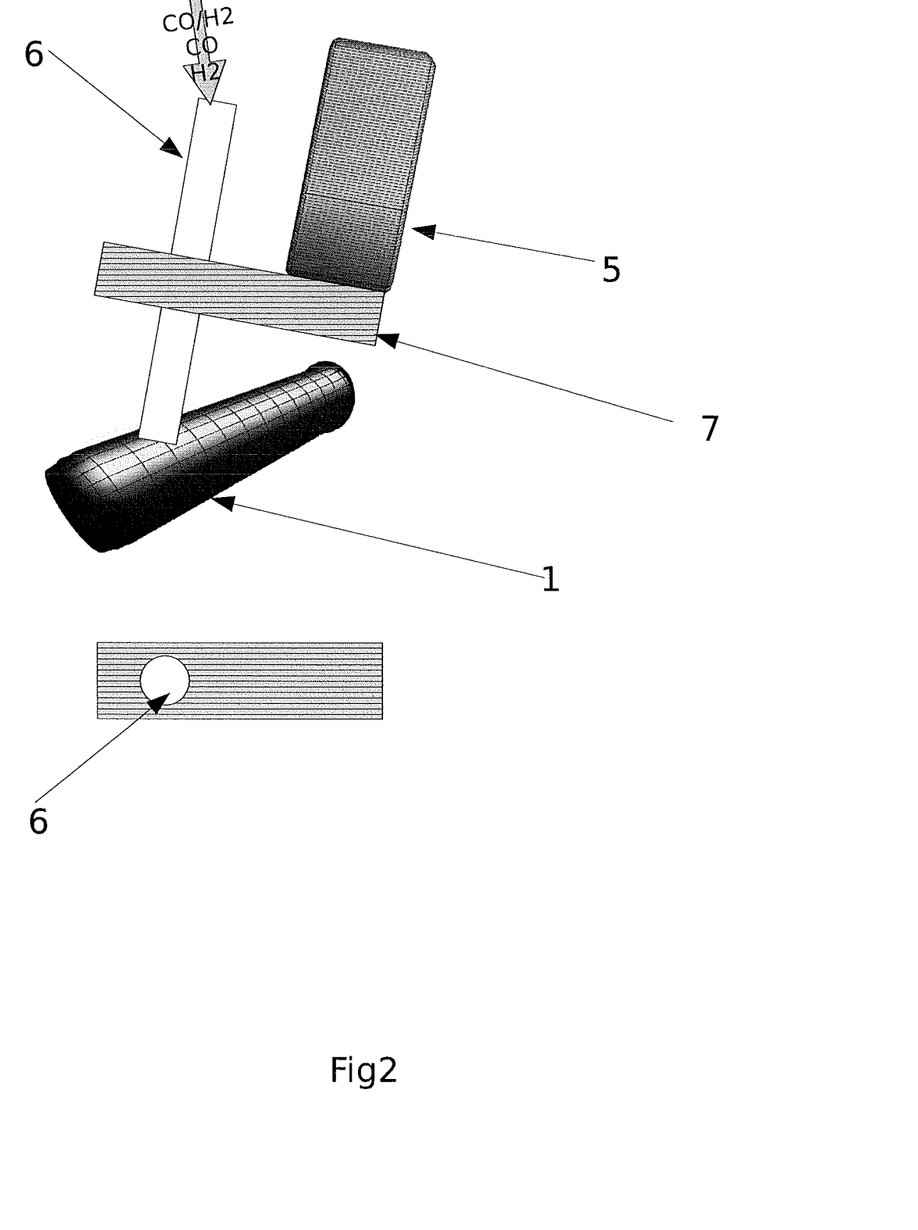
FIG. 2 is a diagram showing a syngas activation device.
Figure 3:
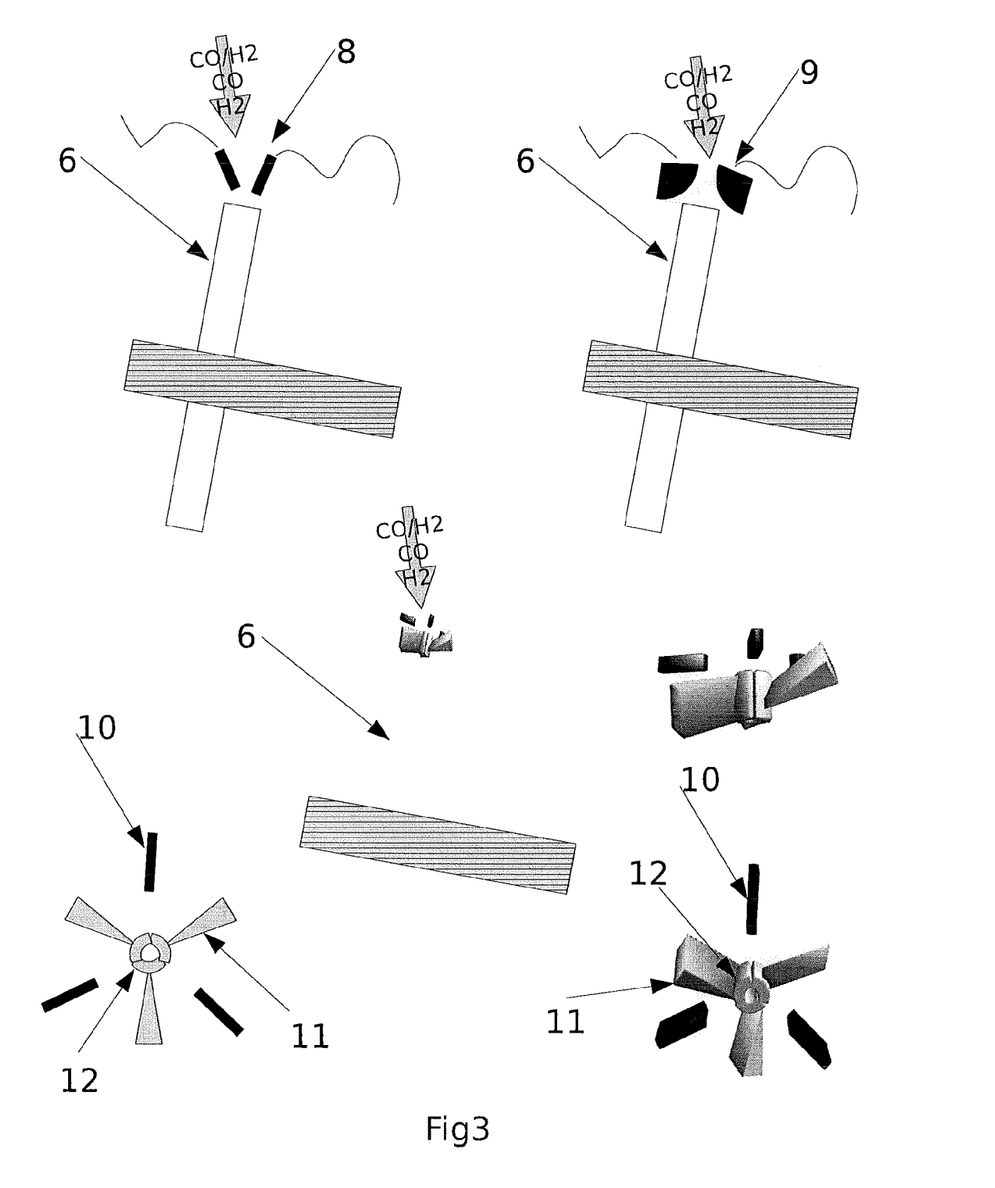
FIG. 3 is a diagram showing a device for activating syngas.
Figure 4:
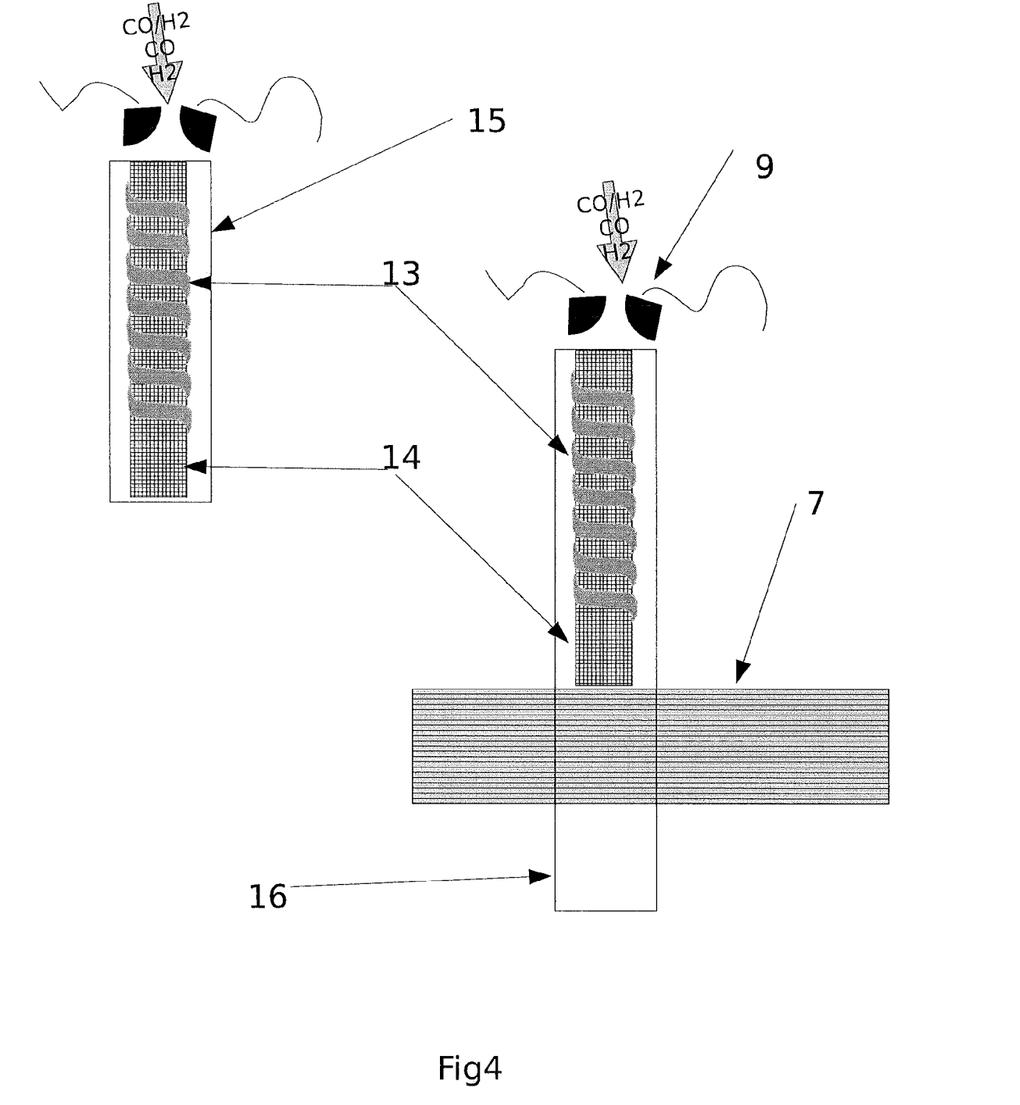
FIG. 4 is a diagram showing a device for activating syngas.
Figure 5:
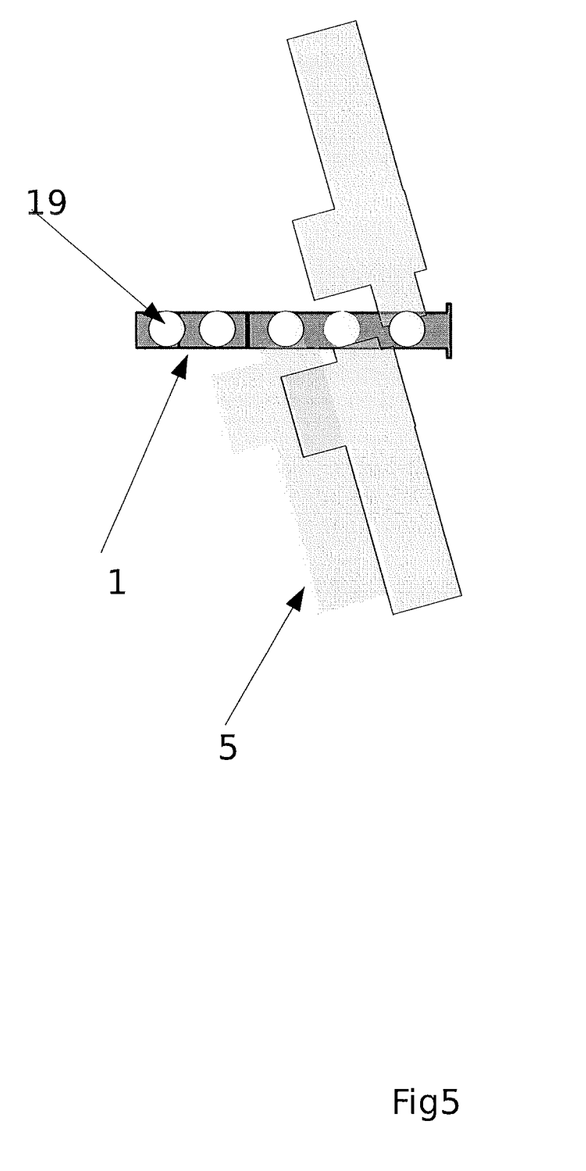
FIG. 5 is a diagram showing an example of a regular arrangement of syngas plasma excitation source.

The application of the activated gases to the particles in turn, and thus the action of the gases in turn on the particles, making it possible to control the growth of the synthesis, is preferably achieved by causing a phase of particles, formed of catalytic or non-catalytic particles, to circulate in a reactor tube (FIG. 1-1) of any diameter, but preferably between 1 centimeter and 20 centimeters. The particle phase, having particle sizes of between 5 nanometers and five centimeters, is exposed at regular intervals to a plasma originating from a gas. The gas used to generate the plasma may be:

hydrogen, making it possible to activate said plasma so as to hydrogenate it, the carbon monoxide and/or to activate the particle surface.

monoxide, the carbon making it possible to activate carbon monoxide to lengthen the carbon chains, or a mixture of these two gases.

The activated elements react with one another and/or with the catalytic particles to produce the compounds of an FT reaction, in other words mostly olefins, paraffins, alcohols and water. In some embodiments, further gases, such as but not limited to helium, argon or nitrogen, may be added to the gas used to form the plasma so as to improve the plasma formation.

A) In a particular embodiment, the means used to advance the particle phase in the reactor tube is a helical system or endless screw (FIG. 1-2, 3) enclosed in the reactor tube. The endless screw comprises a flexible scraper or a system of metal sweepers (FIG. 1-4), making it possible to prevent the particles and materials from sticking to the walls of the reactor tube. The endless screw may be made of any type of material resistant to high temperatures of typically 600 to 1000° C., such as but not limited to ceramics, metal, heat-resistant polymer etc. In some embodiments, the helix or endless screw is made of iron or iron alloy, in particular steels and particularly cobalt or nickel alloys. Specifically, cobalt and iron are two catalysts for Fischer-Tropsch "FT" reactions.

B) In some embodiments, the particles used may be but are not limited to iron particles, silicon carbide particles coated with or containing cobalt, iron particles coated with or containing cobalt, diamond particles, hollow or otherwise, diamond nanoparticles, hollow or otherwise, diamond particles or nanoparticles coated with or containing cobalt, diamond particles or nanoparticles coated with or containing iron, silicon carbide particles comprising diamond particles, copper particles comprising any mixture of the aforementioned elements.

B-1) In a particular embodiment, the particles consist of a ceramic core such as silicon carbide, ceramics, of aluminium, or of oxides such as silicon, aluminium, titanium, zirconium, magnesium, silicon/magnesium, gallium, caesium oxides or even particles of carbon or of zeolite sieves etc. In a preferred embodiment, the core consists of a silicon carbide sponge comprising diamond nanoparticles.

B-2) In some embodiments, the cores or particles are coated with an ionic catalyst and/or metal oxide catalyst consisting of any mixture of ions or oxides including but not limited to ions or oxides of iron (ferric, ferrous), copper (cupric or cuprous), cerium, potassium, lanthanum, cobalt, calcium, zinc, aluminum, fluorine, magnesium, manganese, nickel, ruthenium, rubidium, Group I metals (alkali metals, Li, Na, Rb, Cs, or Fr) or Group II metals (alkaline earth metals, Be, Mg, Ca, Sr, Ba, or Ra) etc.

B-3) In some embodiments, the particles are replaced or supplemented with crushed plastics or other plastics material polymers. Preferably, these plastics are crushed to a particle size of less than 5 millimeters. These polymers or plastics may be coated with ionic catalyst and/or metal oxide catalyst.

C) In a particular embodiment, the activated gas plasmas are brought about by microwaves (microwave-generated plasmas), more particularly microwaves generated by magnetrons 5. In a more particular embodiment, the plasma is generated by a system comprising a tube transparent to microwaves such as quartz 6. The tube has a diameter D preferably equal to $\lambda/4$ or $\lambda/2$, $\lambda$ being the wavelength of the microwaves used or $\lambda/4$ being equal to preferably approximately 6 centimeters for 2.45 GHz. The transparent tube is arranged through the waveguide of a magnetron, preferably such that the main axis of the tube is in the centre of the waveguide (FIG. 2-7) and the walls of the waveguide are preferably at a distance of $\lambda/4$ or $\lambda/2$ from the centre of the cylinder. While propagating in the waveguide, in an overall direction perpendicular to the axis of the quartz tube, the microwaves pass through the transparent wall of the tube and interact with the gas circulating in the quartz tube along the axis thereof, perpendicular overall to the microwave propagation. Upon passing through the microwaves, the gas is ionised and forms a plasma.

D) In a particular embodiment, two live electrodes (FIG. 3-8) are arranged at the entrance to the transparent cylinder, making it possible to generate an electric arc capable of bringing about an activated gas in the form of plasma (electrically generated). In a more particular embodiment, the electrodes are divergent (FIG. 3-9), stretching out the electric arc which slides along the electrodes under the action of the gas circulating in the tube and forms a plasma brought about by unbalanced electric arcs. Specifically, while circulating in the tube, the gas extinguishes the electric arcs which form between the two electrodes.

In a more particular embodiment, the electrodes at the entrance to the tube are replaced with a tripod of three electrodes arranged at 120° to one another (FIG. 3-10), the three electrodes being brought to the same potential. A three-blade helix 11 is arranged opposite the tripod, such that each blade forms an electrode linked to one of the terminals 12 of a rotating connector which forms the axis of rotation of the helix. Three conductive buffers link the rotating connector (carbon or another conductive material), making it possible to bring the helix blades to the same potential such that a difference of potential of hundreds or thousands of volts is established between the helix blades and the electrodes of the tripod. The difference of potential between the electrodes of the tripod and the electrodes of the helix makes it possible to form an unstable electric arc between the electrodes of the tripod and those of the helix. Specifically, under the action of the gas the helix rotates, when a helix is opposite an electrode of the tripod, an electric arc forms between the helix and the electrode of the tripod. The arc is stretched as the helix moves, forming an unbalanced arc, bringing about a plasma in the gas which is amplified under the action of the microwaves.

E) In another configuration, the plasma is brought about by induction, being generated by a solenoid 13 surrounding the tube made of quartz or silicon carbide or any other ceramic or material permeable to electromagnetic fields 14 in which the gas for generating the plasma circulates. In a particular embodiment, the solenoid has 7 turns. A high-frequency alternating current, for example 800 megahertz, passes through the solenoid, leading to the formation of the plasma by induction in the gas passing through the quartz tube. The quartz tube and the solenoid are enclosed in another external tube 15, forcing part of the gas to circulate through the solenoid, making it possible to cool it. The plasma initiation systems are the same as those disclosed for the microwave plasmas disclosed in section D.

F) In a particular configuration, the external tube 15 disclosed in section E is the same as the transparent tube, of 1 to 50 centimeters in diameter but preferably 6 centimeters in diameter, disclosed in section C (FIG. 4-16, FIG. 3-6), such that the solenoid and the quartz tube are enclosed in the tube transparent to microwaves upstream from the waveguide in the gas circulation direction. The plasma initiation systems are the same as those disclosed in D, and are preferably unbalanced electric arc systems so as to form a plasma of a three-way unbalanced, induction and microwave nature. More generally, the process makes it possible to form a plasma originating from any combination of microwaves, induction, electric arcs or unbalanced electric arcs. More particularly, in some embodiments, the device makes it possible to generate combined induction and microwave plasmas.

G) In a particular configuration, the reactor comprises a tube (FIG. 1-1) made of metal or ceramics, such as but not limited to steels, titanium, silicon carbide, nitride, nickel, copper, tantalum, niobium, alloys of these metals, cobalt steel or any other appropriate material etc., of any length but preferably between 50 centimeters and 20 meters and any diameter but preferably between 3 and 20 centimeters. Preferably, this is an iron alloy which may include nickel, cobalt and potentially any other element promoting the catalysis (FT), excluding FT catalyst poisons such as sulphur and the derivatives thereof, etc. Generally speaking, the tube may be made of any alloy of materials resistant to high temperatures preferably greater than 600° C.

In the catalytic part of the reactor, the reactor tube is enclosed in another tube of a larger diameter (FIG. 1-16), forming an exchanger in which a heat-transfer fluid circulates, for example water or $CO_2$ (FIG. 1-17, 18). By circulating, this fluid makes it possible to cool the reactor and to keep the exothermic FT reaction taking place in the reactor at desired temperatures of preferably between 100° C. and 700° C. The exchanger tube is optionally replaced or supplemented with radiator fins, welded to the tube and cooled by air or water or water spray.

Figure 6:
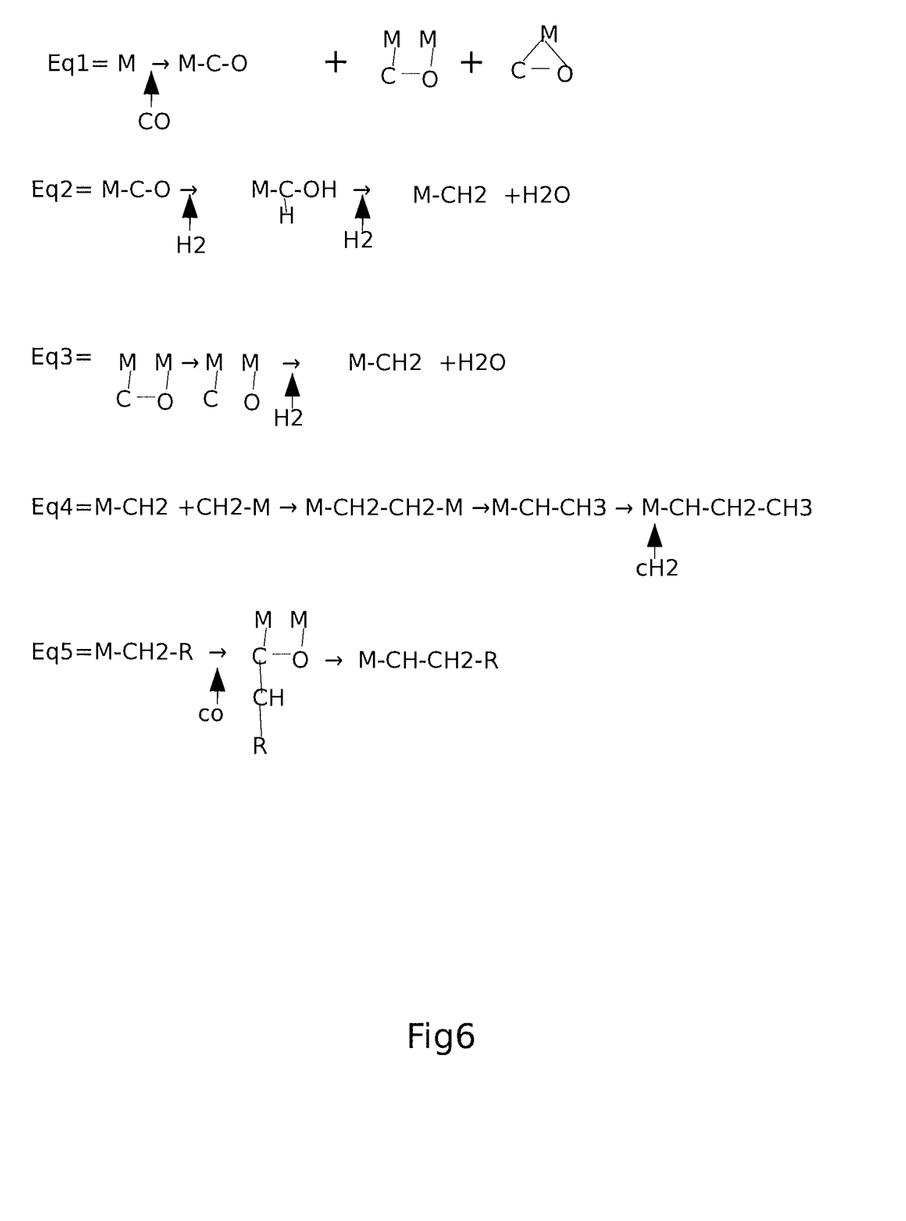
FIG. 6 is a diagram showing the type of reactions taking place in the reactor.

H) Entrances 19, for the plasma torches 15, 16, 6 continued by the transparent quartz tube, are arranged regularly along the reactor. For example, a plasma torch will be arranged every three pitches of the conveyor helix. In the reactor, the torches blow the gas plasma comprising the constituent elements of the activated gas, in the form of ions, free radicals and other active intermediaries. The elements of the plasma react with the catalysts and/or the particles, such as the nanodiamonds and/or the crushed plastics, or the core phase of the particles, possibly formed by reactions of any type or the combination thereof (FIG. 6, Eq. 1, Eq. 2, Eq. 3, Eq. 4, Eq.5) but not limited thereto. The plasma torches are characterised in that they do not inject any microwaves into the inside of the reactor.

To promote the growth of the hydrocarbons, the plasmas are alternated between carbon-monoxide-based plasmas and dihydrogen-based plasmas.

In some embodiments, mixed dihydrogen/carbon monoxide plasmas are formed. In other reaction types, only dihydrogen plasmas or only carbon monoxide plasmas are formed, the CO or $H_2$ being injected into the following torch entrance in gaseous form.

Typically, a CO-based plasma is blown in the first torch, followed by an $H_2$-based plasma in the second torch and so on along the reactor. For example, there may be 10 or 100 pairs of CO and $H_2$ torches in succession, with no limitation on the number. In other embodiments, the CO and $H_2$ plasmas follow in succession within the same torch.

I) The reactor is insulated from the atmosphere by a process of charging and discharging the catalytic particles and discharging the hydrocarbons and other gaseous or liquid compounds formed.

Figure 7:
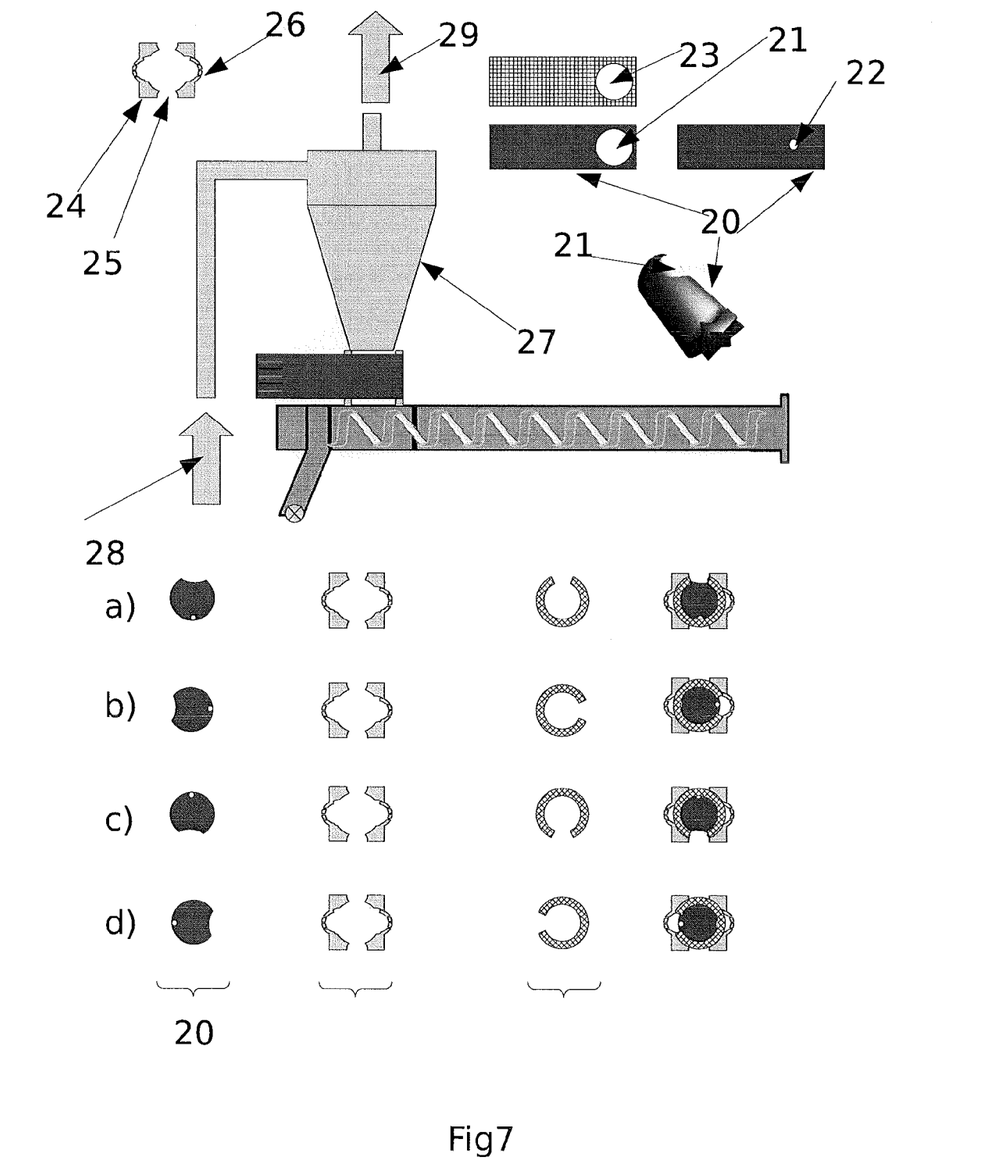
FIG. 7 is a diagram showing a reactor charging device.

I-1) Two nested cylinders rotating in opposite directions are for example arranged at the entrance to the charging device, the inner cylinder 20 being solid and being provided with a recess 21 perforated in the base thereof by a series of pores 22 opposite the opening to the recess. The outer cylinder enclosing the inner cylinder is provided with an opening 23 of the same size as the opening of the recess of the inner cylinder. The two cylinders are enclosed in a cylindrical chamber 23, provided with two openings 25, upper and lower, of the same size as the openings of the two aforementioned cylinders, and with two opposing series of pores arranged laterally in an equatorial position 26. Each series of pores of the cylindrical chamber is arranged on an outer embossment 26, making it possible to prevent the pores from blocking when crossing the pores arranged on the inner cylinder during the rotation of the different cylinders.

In position:

FIG. 7-a), the openings of the cylinders are vertically aligned with the opening of the cylindrical chamber, making it possible to fill the recess.

FIG. 7-b), rotating for example through a ¼-turn in opposite directions, the inner cylinder recess is covered by the outer cylinder whilst the pores at the base of the recess are positioned facing the opening of the outer cylinder opposite the first embossment of the cylindrical chamber. The first embossment is linked to a vacuum pump which evacuates the atmosphere from the recess (external atmosphere).

FIG. 7c), continuing the rotations in opposite directions for example through an additional ¼-turn to reach a ½-turn, the two openings of the inner and outer cylinders align with the lower opening of the cylinder chamber, making it possible for the contents of the recess to be poured into the interior of the reactor without contaminating the external air, the pores of the base of the recess being covered by the outer cylinder, FIG. 7-d), continuing the rotation through for example a ⅓-turn to reach ¾, the pores in the base of the recess are aligned with the opening of the outer cylinder facing the second embossment, which is in turn linked to a second vacuum making it possible to pump the atmosphere from the reactor to the interior of the reactor. Subsequently, a further cycle begins. The vacuums are formed by pumps or Venturi tubes which pump the atmospheres to the exterior and interior of the reactor respectively.

In a particular embodiment, the upper recess of the cylindrical chamber is linked to the lower outlet of a charging cyclone 27.

Figure 8:
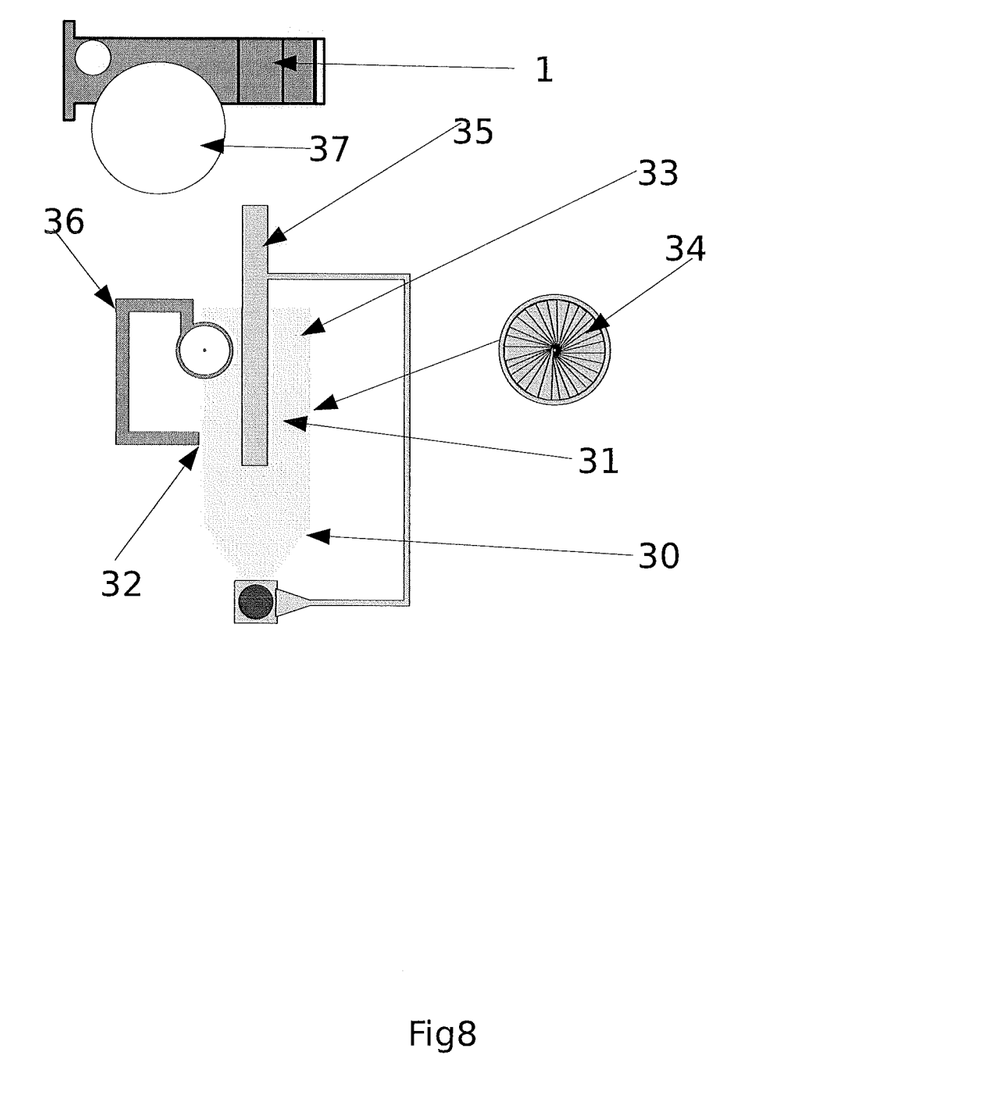
FIG. 8 is a diagram showing a device for unloading the reactor.

I-2) In a particular embodiment, the device for outputting substrates and catalytic particles is formed by a system of cyclones. In a particular configuration, the system of cyclones is formed by a double-entrance charging cyclone 30 having a longitudinal entrance 31 for substrates and particles and a tangential entrance 32 for the gases. The reactor 1 opens 37 into a first cylindrical collection chamber 33, into which the substrates from the FT reactions and the catalytic particles fall. This collection chamber is above the longitudinal entrance 31 of a conical charging cyclone. The longitudinal entrance of the charging cyclone is formed of inclined blades 34 so as to allow the particles and the liquid and solid substrates to pass through, orientating them in the direction of rotation of the vortex which is induced by the cone of the cyclone. Through the longitudinal entrance. A pipe 35 recovers the gases rising from the central gas column, which are formed in the charging cyclone, and guides them through the reservoir to other distillation units to be recovered. A tap located at the end of the reactor pipe 36 recovers the gases circulating in the reactor and guides them to the tangential entrance 32 of the charging cyclone. Under the action of these gases, a descending vortex forms in the cyclone, driving the substrates and the particles towards the lower exit of the cyclone whilst the gases rise in a central column towards the recovery pipe. The lower output of the charging cyclone opens into the entrance of a device similar to [that] disclosed in I-1. This outlet makes it possible to evacuate the solids and liquids from the reactor without contamination by the external air. A non-return valve may be installed in the upper part of the recovery pipe. The gases exiting the recovery pipe can be distilled into the different fractions thereof.

J) In a particular embodiment, the heat exchanger of the reactor is interrupted before the end thereof and replaced with an insulator, and therefore this part of the reactor is not thermostated, the temperature rises to this level as a result of the FT reaction. The increase in temperature interrupts the reaction and leads to vaporisation of the synthesised organic compounds which are then recovered in the gaseous phase and can be distilled. Potentially, only some compounds will remain on the catalytic particles, such as tars, which are evacuated together with the catalytic particles and subsequently cracked.

K) In some embodiments, the catalytic particles exiting the reactor are transferred into a solar furnace as disclosed above, potentially comprising:

a metal pipe, closed at the ends by means for causing the substrates and catalytic particles to penetrate and exit without external atmospheric contamination and without the escape of the internal gases, means for concentrating sunlight on the surface of the furnace, optically transparent means for thermally insulating the solar furnace from the external environment, in particular by way of systems of transparent vacuum pipes and/or of gas flow confinement systems, means for injecting microwaves, optionally combined with infrared and plasmas, into the interior of the furnace so as to cause them to react with the substrates, for example to crack them, to evaporate them or to regenerate the catalytic particles, means for injecting gases, in particular $CO_2$, CO or $O_2$, or gaseous plasmas of these gases into the interior of the solar furnace, means such as an endless screw for moving the substrates and the particles along within the solar furnace.

L) In some embodiments, a part of the reactor acts as a tubular solar furnace, in particular the parts without an exchanger at the end of the reactor, which are insulated by means of transparent vacuum tubes on which the sunlight is concentrated, forming a solar furnace integrated into the reactor, and comprises means for injecting the gases or plasma. This part of the reactor makes it possible to vaporise the gas substrates so as to separate them from the catalytic particles at the moment when they exit.

The present invention further relates to:

1. A Fischer-Tropsch process for synthesising olefins, paraffins, alcohols and/or water, characterised in that it comprises the steps of circulating, in a reactor tube (1), a particle phase comprising particles of a size between 5 nm and 5 cm, and exposing this particle phase at regular intervals to at least one plasma from at least one gas such as dihydrogen, carbon monoxide and/or a mixture thereof;

2. A process according to paragraph 1, characterised in that the particles are selected from: iron particles, silicon carbide particles coated with or containing cobalt, iron particles coated with or containing cobalt, diamond particles, hollow diamond particles, diamond particles coated with or containing cobalt, diamond particles coated with or containing iron, silicon carbide particles comprising diamond particles, copper particles comprising any mixture of the aforementioned elements, particles having cores made of ceramics such as silicon carbide, ceramics of aluminium or silicon, aluminium, titanium, zirconium, magnesium, silicon/magnesium, gallium, caesium oxides, or even particles of carbon or of zeolite sieves, preferably particles having cores each comprising a silicon carbide sponge and diamond nanoparticles which are preferably hollow;

3. A process according to paragraph 2, characterised in that the cores or particles are coated in ionic catalysts, metal oxide catalysts, such as a mixture of ions and/or oxides such as oxides corresponding to iron, ferric iron, ferrous iron, copper, cupric copper, cuprous copper, cerium, potassium, lanthanum, cobalt, calcium, zinc, aluminium, fluorine, magnesium, manganese, nickel, ruthenium, rubidium, and/or group I metals (alkali metals, Li, Na, Rb, Cs, Fr) and/or group II metals (alkaline earth metals Be, Mg, Ca, Sr, Ba, Ra);

4. A process according to any of the preceding paragraphs, characterised in that the plasma is generated by microwaves (5), by induction (13), by electric arcs (8, 9, 10, 11), by unbalanced electric arcs, or by any combination of microwaves, induction, electric arcs and unbalanced electric arcs.

The invention further relates to:

5. A device for carrying out the process according to any of paragraphs 1 to 4, characterised in that it comprises a reactor tube (1) made of metal or ceramics, such as aluminium oxide, AlTi, steel, titanium, nickel, copper, cobalt, refractory steel and zirconium, means (2) for moving the particles along in the reactor tube, and means (5, 8, 13) for generating a plasma in the reactor tube;

6. A device according to paragraph 5, characterised in that the means for moving the particles along in the reactor tube comprise an endless screw (3) or a helix;

7. A device according to paragraph 6, characterised in that it comprises at least one magnetron (5) for generating microwaves, this magnetron being linked to a waveguide (7) which is passed through by the reactor tube (1), which is formed from material transparent to microwaves and has a diameter equal to $\lambda/4$ or $\lambda/2$, $\lambda$ being the wavelength of the microwaves, the microwaves which propagate in the waveguide being intended to pass through the reactor tube and interact with the gas circulating in the tube to form the plasma;

8. A device according to either paragraph 6 or paragraph 7, characterised in that it comprises a solenoid (13) surrounding the reactor tube (14) which is formed from a material permeable to electromagnetic fields and in which the gas circulates, the solenoid being intended to be passed through by a high-frequency alternating current so as to lead by induction to the formation of the plasma in the gas passing through the reactor tube;

9. A device according to any of paragraphs 6 to 8, characterised in that live electrodes (8) which are able to initiate a plasma are arranged at an entrance to the reactor tube and are intended to form unbalanced electric arcs under the action of the shape of the electrodes and the circulation of the gas in the tube;

10. A device according to any of paragraphs 6 to 9, characterised in that the insulation of the internal and external atmospheres of the reactor tube is provided by systems (20, 23) comprising at least two nested coaxial cylinders rotating in opposite directions in a cylindrical chamber (24), each cylinder comprising at least one recess (21, 23), the atmosphere of which can be evacuated without the atmosphere of the recess of the other cylinder being evacuated;

11. A device according to any of paragraphs 6 to 10, characterised in that it comprises a solar furnace which makes it possible to heat the particles, this solar furnace comprising:

at least one metal pipe, closed at the ends thereof by means for causing the substrates and catalytic particles to enter and exit without external atmospheric contamination and without the escape of the internal gas, at least one means for concentrating sunlight on the surface of the furnace, at least one optically transparent means for thermally insulating the solar furnace from the external environment, in particular by way of systems of transparent vacuum pipes and/or of gas flow confinement systems, at least one means for injecting microwaves, optionally combined with infrared and plasmas, into the interior of the furnace so as to cause them to react with the substrates, for example to crack them or to regenerate the catalytic particles, at least one means for injecting at least one gas, in particular $CO_2$, CO or $O_2$, or gaseous plasmas of these gases into the interior of the solar furnace, and at least one means such as an endless screw for moving the substrates and the particles along within the solar furnace.

LIST OF REFERENCE NUMERALS

1 reactor pipe/tube
2 helix or endless screw system
3 drawing representing a helix or endless screw
4 flexible scraper or system of metal sweepers on a helix or endless screw
5 magnetron
6 tube transparent to microwaves such as quartz
7 waveguide 8 live electrodes, arranged at the entrance to the transparent cylinder
9 divergent electrodes
10 tripod of three electrodes arranged at 120° to one another and brought to the same potential
11 blade of the helix having three blades arranged at 120° such that each blade forms an electrode
12 terminals of a rotating connector
13 solenoid
14 the tube made of quartz or silicon carbide or any other ceramic, enclosed by the solenoid
15 tube enclosing the quartz tube and solenoid
16 exchanger enclosing the reactor
17 heat-transfer fluid inlet
18 heat-transfer fluid outlet
19 entrances for the plasma torches
Eq1 M: catalysts, initiation
Eq2-Eq3 interaction of hydrogen in the carbon species
Eq4-Eq5 chain growth
20 inner rotating cylinder
21 inner cylinder recess entrance
22 pores arranged at the base of the recess of the inner cylinder
23 opening of the outer cylinder, of the same size as the opening of the recess of the inner cylinder
24 cylindrical chamber
25 opening of the cylindrical chamber
26 embossment provided with pores of the cylindrical chamber
27 charging cyclone
28 cyclone entrance for air plus particles
29 cyclone air evacuation
30 double-entrance cyclone having longitudinal and tangential entrances
31 longitudinal entrance for the substrates and particles
32 tangential entrance for the gases
33 cylindrical collection chamber
34 inclined blades at longitudinal entrance of the cyclone
35 pipe for recovering the gases rising in the cyclone
36 tap located at the end of the reactor pipe
37 exit of the reactor pipe.

The invention claimed is:

1. A Fischer-Tropsch process for synthesising olefins, paraffins, and alcohols, wherein the process comprises activating synthesis gases to form a plasma, and subsequently exposing a particle phase, comprising particles of a size between 5 nm and 5 cm, to the activated gases in succession at regular intervals, wherein the synthesis gas comprise a gas selected from the group consisting of dihydrogen, carbon monoxide and a mixture thereof.

2. The process according to claim 1, wherein each of said activated gases is applied in turn to said particle phase.

3. The process according to claim 1, wherein mixtures of said synthesis gases are applied in turn to said particle phase.

4. The process according to claim 3, wherein said mixtures of said synthetic gases are supplemented with additional plasmogenic gases selected from the group consisting of argon, helium, nitrogen and $CO_2$.

5. The process according to claim 1, wherein said exposing is achieved by circulating said particle phase in a tubular reactor and by arranging activated gas entrances regularly along said reactor.

6. The process according to claim 1, wherein said particle phase includes particles selected from the group consisting of iron particles, silicon carbide particles coated with or containing cobalt, iron particles coated with or containing cobalt, diamond particles, hollow diamond particles, diamond particles coated with or containing cobalt, diamond particles coated with or containing iron, silicon carbide particles comprising diamond particles, copper particles comprising any mixture thereof, particles having cores made of ceramics, particles of carbon, and zeolite sieves.

7. The process according to claim 1, wherein said particle phase includes particles including coated cores.

8. The process according to claim 7, wherein each of said coated cores comprises a silicon carbide sponge and diamond nanoparticles.

9. The process according to claim 7, wherein said coated cores are coated with oxides of iron, ferric iron, ferrous iron, copper, cupric copper, cuprous copper, cerium, potassium, lanthanum, cobalt, calcium, zinc, aluminum, fluorine, magnesium, manganese, nickel, ruthenium, rubidium, Group I metals, Group II metals, or a mixture thereof.

10. The process according to claim 7, wherein each of said coated cores comprises cores coated with ionic catalysts or metal oxide catalysts.

11. The process according to claim 1, wherein said activating is generated by microwaves, by induction, by electric arcs, by unbalanced electric arcs, or by any combination of microwaves, induction, electric arcs and unbalanced electric arcs.

* * * * *